Figure 1:
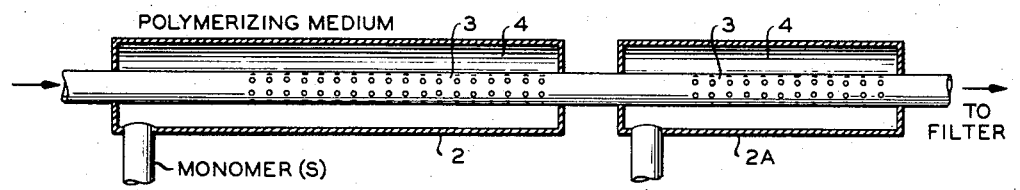

Aug. 30, 1960   P. L. GOMORY   2,951,061
PROCESS AND APPARATUS FOR CONTACTING MATERIALS
Filed Feb. 16, 1956

INVENTOR.
P. L. GOMORY
BY
Hudson + Young
ATTORNEYS

United States Patent Office 2,951,061
Patented Aug. 30, 1960

2,951,061
PROCESS AND APPARATUS FOR CONTACTING MATERIALS

Paul L. Gomory, Broadmoor, Md., assignor to Phillips Petroleum Company, a corporation of Delaware Filed Feb. 16, 1956, Ser. No. 565,897

12 Claims. (Cl. 260—83.7)

This invention relates to contacting of materials. This application is a continuation-in-part of Serial No. 282,725, filed April 16, 1952 and now U.S. Patent No. 2,769,772. In one aspect this invention relates to the contacting of materials by flowing a stream of a material to be contacted with another material through a passageway and flowing said other material through another pssageway adjacent said first mentioned passageway and causing the contacting of said materials by flowing at least one of said materials through a pervious partition or separation member which separates said two streams for at least an appreciable distance of flow. In another aspect of the invention, it relates to the effecting of chemical reaction by flowing a reactant for an appreciable distance adjacent another reactant and causing one of said reactants to comingle with the other through a pervious separation therebetween. In another aspect of this invention, it relates to the contacting of reactants to form high molecular weight organic polymers by flowing at least one monomer in a first tube adjacent to a material to be reacted therewith or contacted therewith, flowing in a second tube said material and causing the monomer to be contacted with said material by flow of one of the said monomer and said material through a pervious portion of tube common to both flows of the substances. In a more specific aspect of the invention, it relates to a method for polymerizing a polymerizable fluid which comprises passing said fluid through one passageway, passing a polymerizing medium through another passageway, adjacent said one passageway and communicating therewith through a pervious wall, and causing said polymerizable fluid to intermingle with said polymerizing medium by passage of one of said polymerizing medium and said polymerizable fluid through said pervious wall. In a still further aspect, the invention relates to a combination of steps in each of which a contact is effected as herein described, for example one section of flow can be devoted to a polymerization reaction, another section of flow can be devoted to a modifying or to a quenching reaction and a further section of flow can be devoted to a coagulation reaction. Another aspect of the invention contemplates the use of a contacting of materials step as herein described to quench a reaction by cooling the same and/or by chemically arresting the same.

In conducting certain reactions or in the contacting of materials, it often happens that there are formed agglomerates which are undesirable. Furthermore, it often happens that these agglomerates or other sticky materials adhere to various portions of the apparatus. Stirring means which have been provided are not entirely satisfactory. Furthermore, when it is necessary to heat and/or to cool a reaction or contacting materials at various stages it is difficult to cause these materials to contact ordinary heat exchanger means because these means quickly become fouled up and inefficient. Furthermore, the cleaning of such means presents a problem. Thus, for example, in the polymerization of an olefin to form a polymer employing a Friedel-Crafts catalyst, such as in the polymerization or copolymerization of isobutylene, it is necessary to obtain practically instantaneous dispersion and admixture of the catalyst stream with the monomer stream in order to produce a homogeneous reaction mixture so that large agglomerates of polymer will not be formed, plugging the apparatus. Also, in the polymerization of an olefin to form a polymer, for example polyethylene, or to form a polymer of butadiene or a copolymer of butadiene with another monomer, particularly by emulsion polymerization, it is necessary to provide agitation which is difficult to do employing ordinary means such as mechanical stirring means because of the formation of undesired agglomerates and material adhering to said means.

An object of this invention is the provision of a method and means for contacting materials. Another object of this invention is to provide a method and means for the effecting of a chemical reaction which requires agitation and homogeneity of reaction mass without need of a stirring means. Another object of the invention is to provide a method and means for polymerizing an olefin such as ethylene. Another object of the invention is to provide a method and means for polymerizing a diolefin. A further object of the invention is to provide a method and means for forming copolymers of olefinic monomers. Another object of the invention is to provide a method and means for the formation of copolymers of olefinic materials with other monomers, for example to form polysulfones. Other aspects, objects and the several advantages of this invention are apparent from a study of this disclosure, the drawings and the appended claims.

According to this invention, there are provided a method and means for handling of material which can be one of an organic reactant and a reaction producing material or medium which comprises a plurality of passageways arranged one within the other, at least one of which is pervious or foraminate, and the steps of passing a material through one of said passageways; passing another material which can affect the treatment of the material in said one of said passageways through an adjacent passageway in proportion and under conditions to cause said another material to pass into said pervious passageway.

Still according to this invention, a polymerizable monomer, such as an olefinic material, alone, or with other olefinic materials or even with a material polymerizable therewith, such as sulfur dioxide, can be passed continuously through a pervious passageway adjacent and in communication with another passageway containing a polymerizing medium and caused to pass into said polymerizing medium in a manner and under conditions set forth and described below. Furthermore, in lieu of the polymerizing medium receiving the said monomer or monomers or other material, the polymerizing medium can be made to flow into the said monomer or monomers or other material.

Whenever a catalyst is employed, it can be present in one or the other or, in part, in both or all of the several flows which are brought together.

Further still, according to the invention, various steps of the production of a final product can be conducted in manner described herein, for example, after admixture of a monomer and the polymerizing medium and flow of the mixture for a time sufficient to produce a desired reaction, a further flow of medium which will quench the reaction by cooling or otherwise, for example, by chemical reaction, can be caused, as described herein, to be intermingled with the flow which has been thus far produced, and still further according to the invention, there can be effected a further treatment step such as a coagulation, all in manner as more fully set forth and described elsewhere herein.

The pervious passageway can be a tube and can be porous or perforate. The tube can be constructed of porous procelain or silicon carbide or it can be constructed of metal and perforated or be made of a sintered metal powder. The perforations in the tube can have various sizes depending upon the particular rates of flow and operation to be effected. Furthermore, the said perforations can be in the form of nozzles. These nozzles can be of the adjustable type. Furthermore, where perforations are employed, these can have various shapes and sizes. It is within the contemplation of this invention that the perforations shall be of gradually diminishing size or increasing size, as the case may be, as the materials which are flowing are being admixed. In this manner, proportioning and control of turbulence and rate of mixing can be accomplished readily.

It will be obvious to one skilled in the art in possession of this disclosure that the invention has wide application in the fields of polymerization and in the control of polymerization and other chemical reactions. However, for puroposes of disclosure the invention will be described as it relates to polymerizations which are herein specifically mentioned.

Figure 2:
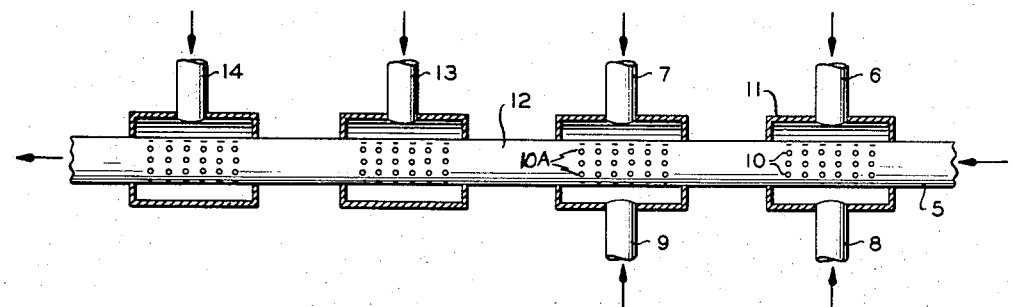
Figure 3:
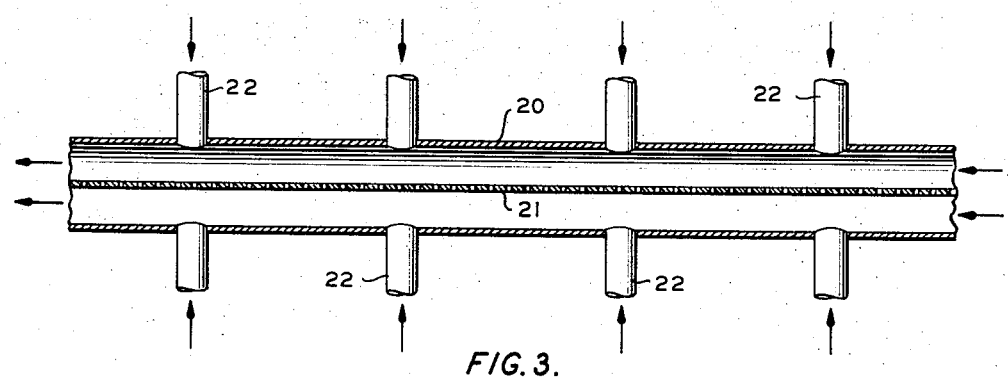
Figure 4:
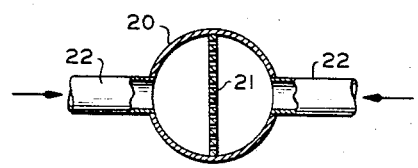

Referring now to the drawing, Figure 1 shows a specific embodiment which is suited to the polymerization of an olefinic material followed by coagulation of the polymer produced. One such polymerization is the polymerization of a conjugated diolefin with or without another material. Figure 2 shows another form of apparatus according to the invention which is particularly suited to a step-wise or incremental admixture of the materials to be polymerized with the polymerizing catalyst. One such reaction is that of a diolefin such as 1,3-butadiene with acrylonitrile. Figure 3 is another form of apparatus showing at least one pervious conduit enclosed within a nonpervious conduit. Figure 4 is an end cross-sectional view of another form of my apparatus in which there is at least one feed to one side of the pervious member and at least one feed to the other side of said member, the feeds comingling as these flow through the apparatus.

Referring now to Figure 1, there is shown an embodiment in which, as above stated, a polymerizable monomer, such as 1,3-butadiene alone or with a comonomer such as styrene, is polymerized. One or more monomers flow through the annular passage between pervious tube 3 and nonpervious tube 2. A polymerizing medium flows through tube 3. The monomer or monomers pass through pervious tube 3 into the polymerizing medium and are there polymerized. Flow velocities are controlled to be such that no mechanical stirring is needed, turbulence providing the necessary agitation. The pressure in annular passage 4 is sufficient to force the monomer or monomers through pervious tube 3 into the interior thereof. When emulsion polymerization is desired, the polymerizing medium can be a soap solution containing a polymerization catalyst such as a peroxide. A coagulant, such as sulfuric acid is added to tube 2A and passes into the interior of porous tube 3 to coagulate polymer. The coagulated ploymerized material is passed from tube 3 to filtration or other recovery means not shown. The pressure in annular passage 4A is sufficient to force the fluid from tube 2A through pervious tube 3 into the interior thereof. When polymerization from solution is desired, the polymerizing medium can be, for instance, a suspension of an aluminum halide or of sodium metal in an inert hydrocarbon.

It will be obvious to one skilled in the art in possession of this disclosure that Figure 1 also lends itself at least in part to the polymerization of olefins such as ethylene, alone or in admixture with other olefinic materials such as propylene, employing a slurry of a solid contact catalyst effective to polymerize the olefins to a high molecular weight polymer in a diluent for the polymerization. For example, a catalyst slurry can be passed through tube 3 and the olefinic material, in solution or not, can be fed by way of the annular passage 4 and forced into the tube 3 containing the catalyst slurry or suspension. After travelling a considerable distance, the polymer-containing mass can be recovered. One such recovery can include conditioning of the mass flowing through the tube after injection of all of the olefin has been accomplished and the polymerization also accomplished. The conditioning can be the dilution with additional diluent to facilitate catalyst separation from the olefin polymer. This is especially advantageous when the reaction product, as obtained, is of viscous character. When additional diluent is injected, it can advantageously be injected through tube 2A.

It is also within the scope of the invention to quench the polymerization by adding another perforate section between tubes 2 and 2A and introducing an agent through the perforations into the reaction mixture to quench or shortstop the polymerization reaction. Such an agent can be a fluid refrigerant or coolant which quenches the reaction by lowering of temperature, or it can be a chemical agent which quenches or arrests the polymerization reaction by chemical action, as will be understood by persons skilled in the art.

Figure 1 also lends itself to the polymerization of olefins such as ethylene, alone or in admixture with other olefinic materials, such as propylene employing a catalyst of the type of organometallic compounds, or organometal halide compounds, or metal halide compounds. Very often such a catalyst, containing one of the aforementioned types of compounds is employed in conjunction with other elements or compounds to form a composite catalyst. Examples of catalysts of this type are to be found, for instance in copending applications, Serial No. 494,281, filed March 14, 1955, which discloses and claims, in part, triethyl aluminum mixed with titanium tetrachloride as catalyst; Serial No. 495,054, filed March 17, 1955, which discloses and claims, in part, a mixture of diethylaluminum chloride and ethylaluminum dichloride and titanium tetrachloride as catalyst; Serial No. 521,367, filed July 11, 1955, which discloses and claims, in part, a mixture of titanium butoxide, diethylaluminum chloride and ethylaluminum dichloride as catalyst, a mixture of titanium butoxide, aluminum chloride and aluminum powder as catalyst, a mixture of titanium butoxide, ethyl bromide and aluminum as catalyst, a mixture of titanium butoxide, aluminum chloride and sodium as catalyst, a mixture of titanium potassium oxalate, aluminum chloride and aluminum as catalyst, and a mixture of triethanolamine titanate, diethylaluminum chloride and ethylaluminum dichloride as catalyst; Serial No. 529,918, filed August 22, 1955, which discloses and claims, in part, a mixture of titanium butoxide, aluminum chloride and lithium aluminum hydride as catalyst, a mixture of titanium potassium oxalate, lithium aluminum hydride and aluminum chloride as catalyst, a mixture of titanium butoxide, lithium aluminum hydride and aluminum bromide as catalyst, a mixture of triethanolamine titanate, lithium aluminum hydride and aluminum chloride as catalyst, and a mixture of titanium butoxide, lithium gallium hydride and aluminum chloride as catalyst; Serial No. 556,482, filed December 30, 1955, which discloses and claims, in part, a mixture of titanium tetrachloride, benzoyl peroxide and an approximately equimolar mixture of ethylaluminum dichloride and diethylaluminum chloride as catalyst, a mixture of zirconium tetrachloride, benzoyl peroxide and an approximately equimolar mixture of ethylaluminum dichloride and diethylaluminum chloride as catalyst, a mixture of titanium tetrachloride, benzoyl peroxide and lithium aluminum hydride as catalyst, a mixture of titanium trichloride, benzoyl peroxide, and an approximately equimolar mixture of ethylaluminum dichloride and diethylaluminum chloride as catalyst, a mixture of titanium tetrachloride, ditertbutyl peroxide, and an approximately equimolar mixture of ethylaluminum dichloride and diethyl aluminum chloride as catalyst, and a mixture of titanium tetrachloride, benzoyl peroxide, ethyl chloride and sodium as catalyst. Such catalysts can be mixed with a diluent for the polymerization, usually hydrocarbon diluents being employed, such as paraffins, cycloparaffins and/or aromatic hydrocarbons which are relatively inert, non-deleterious and liquid under the reaction conditions of the process. Diluents which can be used include the lower molecular weight paraffins, such as propane, butane and pentane which are especially useful when the process is carried out at low temperatures. However, the higher molecular weight paraffins and cycloparaffins such as isooctane, cyclohexane, methyl cyclohexane and aromatic diluents such as benzene, toluene and the like can also be used. Such a catalyst-diluent mixture can be passed through tube 3 and the olefinic material, in solution in another portion of the diluent or not, can be fed by way of the annular passage 4 and through perforations into the tube 3 containing the catalyst mixture flowing therein, and after travelling a considerable distance, during which polymerization is effected, the polymer-containing mass can be recovered. One such recovery can include addition of a catalyst inactivating agent into perforations around the wall of tube 3 by means of injection through tube 2A, in order to quench or arrest the polymerization reaction. Examples of some such catalyst inactivating agents are described and claimed in Serial No. 499,650, filed April 6, 1955, such agents disclosed therein also being effective to decolorize colored polymers.

The feature of adding a coolant to a reaction mixture injected through tube 2A in order to quench a reaction mixture flowing through tube 3 is, of course, generally applicable to chemical reactions which it is desired to quench in order to quickly arrest the reaction mechanism.

Referring now to Figure 2, of the drawing, a suspension medium, which can be water containing an emulsifying agent such as soap, is passed by way of pipe 5 through the system from one end to the other. The suspension medium can also contain a catalyst. At a plurality of spaced injection points 6 and 7, a monomer, in this case acrylonitrile, is introduced into the main stream. The introduction is accomplished through a porous or perforated section of the pipe 5. Also at a plurality of points 8 and 9, a comonomer, in this case 1,3-butadiene, is introduced into the main stream, also through a perforated section of the pipe. These perforated sections are identified as 10 and 10A, respectively. However, as shown in the drawing, the acrylonitrile and butadiene can be introduced at the same place along the line of flow in which event, the two pipes 6 and 8 can lead to a mutual annular space. This annular space is identified as 11. After a plurality of injections which are controlled to synthesize the desired types of molecules, the mass flows past point 12 and on toward the injection points 13 and 14 at which coagulant is introduced.

As mentioned hereinbefore, the invention has wide application in the field of chemical reactions and polymerization reactions and in the control of other reactions. Among polymerization reactions to which the invention is applicable can be mentioned the polymerization of a conjugated butadiene, alone or with other monomers containing a $CH_2=C<$ group either by emulsion or solution polymerization techniques, the polymerization of so-called vinyl polymers, the polymerization of olefins as before mentioned, including the polymerization of an isoolefin, alone or with a conjugated diene hydrocarbon, or with a vinyl aromatic such as styrene in the presence of a Friedel-Crafts catalyst, and the polymerization of an olefin with sulfur dioxide in the presence of catalysts known in the art by either solution or emulsion polymerization recipes.

It will be obvious to one skilled in the art in possession of this disclosure that the modus operandi described is particularly advantageous and, as a feature of the invention, is applicable to the effecting of inorganic and organic chemical reactions. Some examples or organic reactions, the invention being particularly advantageous in organic reactions, are condensation reactions generally, alkylation and polymerization reactions.

Furthermore, the invention is particularly applicable to reactions which exhibit considerable heats of endothermiticity or exothermicity. Thus, one reactant can be step-wise introduced into another and therewith all or part of the desired or required heat of endothermicity or exothermicity can be added or removed as the case may be.

By way of specific examples of chemical reactions, the following are noted: the alkylation of isobutane with ethylene to produce diisopropyl employing an aluminum chloride-hydrocarbon complex catalyst, the alkylation of isobutane with an olefin such as butene in the presence of substantially anhydrous HF as catalyst, and the polymerization of isobutylene in the presence of $BF_3$ as catalyst.

*Example I*

A system similar to that shown in Figure 1 of the drawing is utilized in a continuous process for the manufacture of polyethylene.

A mixture of cyclohexane and the mixture resulting from the addition of ethylaluminum sesquichloride (a substantially equimolar mixture of ethylaluminum dichloride and diethylaluminum chloride) to chromyl chloride is fed through tube 3. The rate of flow of the mixture is 2530 pounds/hour, of which 2520 pounds/hour is cyclohexane and 10 pounds/hour is the complex catalyst. The complex catalyst comprises 9.6 pounds/hour represented by ethylaluminum sesquichloride and .4 pound/hour represented by chromyl chloride. Essentially pure ethylene is pressured into the annular passage between pervious tube 3 and nonpervious tube 2 at the rate of 565 pounds/hour. The ethylene passes through pervious tube 3 due to the differential in pressure and is thus contacted with the complex catalyst. The pressure in pervious tube 3 is 300 p.s.i.a., while the temperature is 100° F. The ethylene is pressured in at 800 p.s.i.a., the approximate vapor pressure of ethylene at normal ambient temperatures. Upon contact with the catalyst, the ethylene is polymerized to high molecularweight polyethylene, this polyethylene being soluble to some degree in the cyclohexane at the temperature being employed. Flow velocities are such in tube 3 that no stirring, other than the agitation which is inherent, is required to effect intimate contact of the catalyst and the ethylene.

After a suitable polymerization period, determined by the desired conversion level, the polymerization catalyst is deactivated by passing water into pervious line 3 via annular section 2A. The rate of flow of the water is 1700 pounds/hour. The resulting mixture, a slurry of solid polyethylene mixed with water and ethylene-polymer-cyclohexane solution, is then passed to a polymer recovery unit wherein solid polymer is removed by filtration. Since some of the polymer is dissolved in the cyclohexane, it is necessary to flash the effluent from 3 to remove the unreacted ethylene and cool the remaining liquid to precipitate out the dissolved polymer prior to filtering the solution to remove solid polymer.

Under the conditions set forth above, using the above-described complex catalyst, said catalyst having a productivity of 6.67 pounds of polymer per pound of catalyst per minute, 200 pounds of polymer will be produced in 3 minutes. The calculated density for the mixture (approximate) is 0.55 (34.3 pounds per cubic foot), thus the flow rate based on a mass flow of 3085 pounds per hour (upstream of the deactivating agent injection point) is 0.025 cubic foot per second. In a 1-inch nominal size pipe (flow area 0.00656 square foot), the velocity would be 3.81 feet per second, thus the length of pipe required between the ethylene injection point and the deactivator injection point is 3 minutes (60 seconds per minute) (3.81 feet per second) equals 685 feet.

The material in this example, insofar as not claimed in this application is claimed elsewhere.

*Example II*

A rubber copolymer of 1,3-butadiene and styrene is prepared by a polymerization process utilizing the apparatus of Figure 2 shown above. This polymerization is carried out by the following recipe:

| Component: | Parts by weight |
| --- | --- |
| Water | 300 |
| 1,3-butadiene | 78 |
| Styrene | 22 |
| Lauric acid | 5.00 |
| Disproportionated rosin acid | 16.00 |
| KOH | 1.50 |
| KCl | 0.30 |
| Sodium salt of condensed arylsulfonic acid | 0.15 |
| Tetrasodium salt of ethylenediamine tetraacetic acid | 0.15 |
| $Na_2SiO_3$ } activator | 1.11 |
| $FeSO_4 \cdot 7H_2O$ } | 1.11 |
| Phenylcyclohexane hydroperoxide (catalyst) | 0.61 |
| Tert-$C_{12}$ mercaptan (modifier) | 0.05 |
| Shortstop: sodium dimethyl dithiocarbamate | 0.25 |

A first stream is fed to pipe 5 of the continuous reactor of Figure 2 from a feed tank (not shown), this stream flowing at the rate of 4169.25 pounds/hour, of which 3825 pounds is water, 75 pounds is lauric acid, 240 pounds is disproportionated rosin acid, 22.5 pounds is KOH, 4.50 pounds is KCl, and 2.25 pounds is the sodium salt of a condensed arylsulfonic acid. A second stream is fed to pipe 6 and through perforations in section 10 at the rate of 1170 pounds per hour, all of which is 1,3-butadiene. At a distance of 10 feet downstream of section 10, a third stream is fed in through pipe 7 at the rate of 339.9 pounds per hour, of which 380 pounds is styrene, 9.15 pounds is phenylcyclohexane hydroperoxide, and 0.75 pound is tert-dodecyl mercaptan. At a distance of 75 feet downstream of section 10A a fourth stream is fed in through 13 at the rate of 710.55 pounds/hour, of which 675 pounds is water, 16.65 pounds is $Na_2SiO_3$, 16.65 pounds is $FeSO_4 \cdot 7H_2O$ and 2.25 pounds is the tetrasodium salt of ethylenediamine tetraacetic acid. The appreciable distance of 75 feet is provided so that complete emulsification of the monomers can take place prior to feeding in the activator, since the addition of the activator causes polymerization to start. Thus the mass flow rate of material in the tube downstream of the fourth stream entry point is 6389.7 pounds/hour, and the specific gravity of the flowing material is 0.92 (57.3 pounds/cubic foot). In order to maintain suitable turbulence, thus providing for a high coefficient of heat transfer necessary to maintain the reaction zone at 48° F., a velocity of about 5 feet per second is used in the reaction zone, the section between entry points 13 and 14. Therefore, the central tube used is a 1-inch nominal size pipe. The recipe employed, at a temperature of 48° F., brings about a conversion of monomer to polymer of 80 percent in 13.8 minutes. The distance between entry points 13 and 14 for 80 percent conversion is 4150 feet. To stop the polymerization, 187.5 pounds/hour of a 2 percent by weight aqueous solution of sodium dimethyl dithiocarbamate is fed in through 14 as a fifth stream. The resulting mixture downstream of 14 is then treated with brine to coagulate the polymer, and 1200 pounds/hour of a 78/22 butadiene-styrene copolymer is recovered. The remaining unconverted monomers, 234 pounds/hour of 1,3-butadiene and 66 pounds/hour of styrene are stripped off of the latex emulsion prior to coagulating the polymer.

The procedure employed in the above example can be altered in various ways. The length of tube required for the polymerization step can be reduced by effecting preliminary polymerization in a conventional manner such as in a large stirred reactor, polymerizing to a percent conversion lower than finally to be attained, withdrawing the polymerization mixture from such reactor well before the viscosity has become high and thus before heat transfer, stirring and accumulation of solids have become major problems, and then finishing the reaction in the tube. When polymerizing to a lower final conversion, as for instance 60 percent conversion, as will be understood by those skilled in the art, a shorter tube length will suffice.

*Example III*

In an HF-catalyzed reaction in which isobutane is alkylated with a mixture of isobutylene and some propylene, there is introduced into one end of a pervious tube member a mixture of isobutane and some catalyst which is pumped from one end of the pervious tube member to the other end at which there is a catalyst settling chamber, further discussed later herein. The tube is pervious only at places selected along its length and these places are each of them separately surrounded by a nonpervious tube member or section which is sealed to provide a place of injection into the pervious tube member of additional quantities, in the order named, at each of said places, separately, of a predetermined quantity of the olefin-containing mixture, above-described, in an amount to accomplish a desired ratio of isobutane to olefin, which, in this example, is maintained at least at 4 mols of isobutane for each mol of olefinic mixture. It will be noted that the injection of the olefin through the pervious portion of the tube from the first injection tube or chamber causes immediate rapid dispersion of the olefinic mixture into and throughout the mass of isobutane and catalyst. This causes some alkylation to occur immediately, releasing heat, following which at the next pervious section there is introduced a quantity of isobutane as a diluent and coolant, thus to regulate the temperature of the stream passing through the pervious tube section within the injection section, now described. The procedure described is continued for at least three more injections of additional olefinic material and additional diluent and coolant, following which the entire alkylated mixture is passed to the catalyst settler. In the settler hydrocarbon phase is formed and is removed for further processing as known in the art. Catalyst which is separated is, at least in part, recycled.

It will be obvious to those skilled in the art in possession of this disclosure and who are skilled in the art of alkylation that other catalysts than those described in this application can be employed. For example, sulfuric acid alkylation catalyst, or for that matter, any other fluid alkylation catalyst can be substituted in the foregoing example.

It will be noted that, by operating the alkylation according to the foregoing example, cooling coils placed internally of the alkylation zone have been dispensed with. Also, the relatively very simple equipment which is required does not require any agitation means. By suitably sizing and selecting the number of perforations or pervious portions of tubing which are enclosed within the injection section, it is possible to accomplish desired degrees of turbulence. Also, it will be noted that, as the various portions of injected material increase the total volume being transported, it is within the scope of the invention to gradually enlarge the pervious tube member to accomodate the increased volume. Of course, if desired, it is possible to periodically remove at least a portion of the alkylate mixture within the pervious tube member and to take it elsewhere for further treatment or to directly inject it into the settling vessel without passing it through ensuing injection portions of the said pervious tube member.

As will be evident to those skilled in the art, various

I claim:

1. A method for polymerizing a polymerizable monomer which comprises flowing a polymerizing medium through a pervious conduit, flowing said monomer through a nonpervious conduit enclosing said pervious conduit, forcing said monomer from said nonpervious conduit into said pervious conduit, commingling said monomer with said polymerizing medium through turbulence of flow, and recovering a polymeric product.

2. A method for contacting materials which comprises flowing a first fluid in a pervious conduit, flowing a second fluid in a nonpervious conduit enclosing said pervious conduit, where one of said first and second fluids contains at least one polymerizable monomer, and the other of said first and second fluids comprises a polymerizing medium, forcing one fluid through foramina which are in the walls of said pervious conduit, into the other said fluid, commingling said first and second fluids through turbulence of flow, and recovering the commingled fluid containing a high molecular weight polymer resulting from polymerization of said at least one polymerizable monomer.

3. A method of claim 2 wherein at least one of said first and second fluids contains a polymerization catalyst.

4. A method for contacting materials which comprises flowing a first fluid in a first elongated passageway; flowing a second fluid in a second elongated passage way which is adjacent said first passage way and laterally communicates therewith through a foraminous wall, wherein one of said first and second fluids contains at least one polymerizable monomer and the other of said first and second fluids comprises a polymerizing medium, forcing one fluid through foramina in said wall into the other said fluid, comingling said first and second fluids through turbulence of flow, and recovering the comingled fluid containing a high molecular weight polymer resulting from polymerization of said at least one polymerizable monomer.

5. A method of claim 2 wherein a polymerization quenching medium is added to said comingled fluid, before said recovery, through still other foramina in the walls of said pervious conduit.

6. A method of contacting materials and effecting polymerization, which comprises: flowing a first fluid in a pervious conduit; flowing a second fluid in an impervious conduit enclosing said pervious conduit, where one of said first and second fluids contains ethylene and the other of said first and second fluids contains a catalyst resulting from the addition of ethylaluminum sesquichloride and chromyl chloride, and cyclohexane; forcing one fluid through foramina which are in the walls of said pervious conduit, into the other said fluid; comingling said first and second fluids through turbulence of flow, and during said comingling polymerizing ethylene in an exothermic reaction to form a high polymer; adding water as a reaction quenching medium to said comingled fluid through still other foramina in the wall of said pervious conduit and recovering said quenched, comingled fluid containing said high polymer.

7. A method of contacting materials and effecting polymerization, which comprises: flowing a first fluid in a pervious conduit; flowing a second fluid in a nonpervious conduit enclosing said pervious conduit, where one of said first and second fluids contains an aqueous emulsified agent, 1,3-butadiene and styrene and the other of said first and said second fluids contains a polymerization catalyst; forcing one fluid through foramina, which are in the walls of said pervious conduit, into the other said fluid; comingling said first and second fluids through turbulence flow and during said comingling polymerizing butadiene and styrene in an exothermic reaction to form a high polymer; adding a reaction quenching medium to said comingled fluid through still other foramina in the wall of said pervious tube, and recovering said quenched comingled fluid containing said high polymer.

8. A method of contacting materials and effecting polymerization which comprises: flowing a first fluid in a pervious conduit; flowing a second fluid in a nonpervious conduit enclosing said pervious conduit, where one of said first and second fluids contains a polymerizable olefin and the other of said first and second fluid contains a catalyst selected from the group consisting of an organo metallic compound, an organo metal halide compound and a metal halide compound; forcing one fluid through foramina, which are in the walls of said pervious conduit, into the other said fluid; comingling said first and said second fluids through turbulence of flow and during said comingling polymerizing said olefin in an exothermic reaction to form a high polymer; adding a reaction quenching medium to said comingled fluid through still other foramina in the wall of said pervious tube, and recovering said quenched comingled fluid containing said high polymer.

9. A method of claim 8 wherein said polymerizable olefin is ethylene and said catalyst is admixed with a hydrocarbon diluent.

10. A method for contacting materials and controlling an exothermic reaction which comprises flowing a first material in a conduit having pervious wall sections spaced along its length separated by impervious wall sections, flowing a second material in a non-pervious conduit enclosing a first said pervious wall section in a direction generally parallel to the direction of flow of said first material, where at least one of said materials contains a reactant and the other of said materials is a material which affects the treatment of said reactant, causing said materials to intermingle by gradual lateral passage, over a substantial length of the first-said conduit, of said second material into said first flowing material through foramina which are in the wall of said pervious section, and comingling said fluids through turbulence of flow, and during said comingling effecting an exothermic chemical reaction of said reactant, thereby raising the temperature of the reacting mixture; in the next downstream or second pervious section of said conduit having pervious sections injecting a relatively cold diluent through foramina in the wall of said second pervious section into the reacting mixture, thereby lowering the temperature of the reaction mixture to a desired value; continuing the flow in said conduit having pervious sections spaced along its length and flowing another portion of said second material in a non-pervious conduit enclosing the next downstream or third pervious section in a direction generally parallel to the direction of flow of the materials flowing in said conduit having pervious sections spaced along its length, causing said another portion of said second material to intermingle with the material flowing in said conduit having pervious sections by gradual lateral passage, over a substantial length of said conduit having pervious sections, of said another portion of said second material through foramina which are in the wall of said third pervious section, and again comingling the fluids through turbulence of flow, and during said comingling effecting an exothermic chemical reaction of said reactant, thereby increasing the temperature of the reacting mixture; continuing the flow of the reaction mixture through said conduit having pervious sections and flowing another portion of cold diluent material through foramina in the next downstream or fourth pervious section into the reacting mixture and thereby again lowering the temperature of the reacting mixture to desired value.

11. A method for polymerizing a polymerizable monomer which comprises flowing a polymerizing medium through a first elongated conduit; flowing said monomer through a second elongated conduit that communicates with said first conduit through an elongated pervious partition common to both said first and said second conduits; forcing said monomer from said second conduit, through said partition, and into contact with said polymerizing medium; comingling said monomer with said polymerizing medium; and recovering a polymeric product.

12. A method of claim 10 wherein said first material comprises an isobutane containing HF catalyst, said second material is a mixture of isobutylene and propylene, and said diluent is isobutane.

References Cited in the file of this patent

UNITED STATES PATENTS

| | | |
|---|---|---|
| 1,174,631 | Snelling | Mar. 7, 1916 |
| 1,496,345 | Lichtenthaeler | June 3, 1924 |
| 1,685,759 | Walter | Sept. 25, 1928 |
| 1,958,383 | Naucler et al. | May 8, 1934 |
| 2,254,572 | Harlow | Sept. 2, 1941 |
| 2,377,245 | Krejoi | May 29, 1945 |
| 2,391,818 | Brandt | Dec. 25, 1945 |
| 2,475,520 | Roedel | July 5, 1949 |
| 2,672,488 | Jones | Mar. 16, 1954 |
| 2,753,249 | Idenden et al. | July 3, 1956 |
| 2,769,772 | Gomory | Nov. 6, 1956 |
| 2,784,948 | Pahl et al. | Mar. 12, 1957 |

FOREIGN PATENTS

| | | |
|---|---|---|
| 534,792 | Belgium | Jan. 31, 1955 |
| 694,918 | Great Britain | July 29, 1953 |

OTHER REFERENCES

"Styrene Its Polymers, Copolymers and Derivatives," page 283, Borndy and Boyer, 1952, Reinhold Publishing Co.